US012669422B2

(12) United States Patent
Piedcoq et al.

(10) Patent No.: US 12,669,422 B2
(45) Date of Patent: \*Jun. 30, 2026

(54) DEVICE AND METHOD FOR PERFORMING A COMPLETE BLOOD COUNT AND DETERMINING A SEDIMENTATION RATE

(71) Applicant: HORIBA ABX SAS, Montpellier Cedex (FR)

(72) Inventors: Philippe Piedcoq, Montpellier Cedex (FR); Guilhem Couderc, Montpellier Cedex (FR)

(73) Assignee: HORIBA ABX SAS, Montpelier Cedex (FR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/856,808

(22) PCT Filed: Apr. 14, 2023

(86) PCT No.: PCT/FR2023/050544
§ 371 (c)(1),
(2) Date: Jan. 7, 2025

(87) PCT Pub. No.: WO2023/199008
PCT Pub. Date: Oct. 19, 2023

(65) Prior Publication Data
US 2025/0172476 A1 May 29, 2025

(30) Foreign Application Priority Data
Apr. 15, 2022 (FR) ...................................... 2203572

(51) Int. Cl.
| | |
|---|---|
| *G01N 15/05* | (2006.01) |
| *G01N 15/01* | (2024.01) |
| *G01N 15/14* | (2024.01) |

(52) U.S. Cl.
CPC ............. *G01N 15/05* (2013.01); *G01N 15/01* (2024.01); *G01N 15/14* (2013.01); *G01N 2015/1486* (2013.01)

(58) Field of Classification Search
CPC ........ G01N 15/05; G01N 15/01; G01N 15/14; G01N 2015/1486
See application file for complete search history.

(56) References Cited

U.S. PATENT DOCUMENTS

| | | | | |
|---|---|---|---|---|
| 5,328,822 A | * | 7/1994 | McKinney | ............. G01N 15/05 250/203.1 |
| 6,632,679 B1 | | 10/2003 | Breda | |

(Continued)

FOREIGN PATENT DOCUMENTS

| | | |
|---|---|---|
| CN | 101228426 | 7/2008 |
| CN | 111712703 | 9/2020 |

(Continued)

OTHER PUBLICATIONS

International Patent Application No. PCT/FR2023/050544 filed Apr. 14, 2023; International Search Report / Written Opinion issued Jul. 13, 2023; 13 pages, English language translation included.

*Primary Examiner* — Michelle M Iacoletti
*Assistant Examiner* — Jarreas Underwood
(74) *Attorney, Agent, or Firm* — Mueting Raasch Group

(57) ABSTRACT
A device for performing a complete blood count and for determining a sedimentation rate including a first group arranged so as to sample a blood sample from a tube and to carry out a complete blood count on the sample and a second group arranged so as to sample a blood sample from a tube and to carry out a sedimentation rate determination. At least one sampling member controllable for a measurement by the first group and a measurement by the second group for sampling a blood sample so that a sample sampled for one group is not used by the other group. The second group is (Continued)

Figure 1:
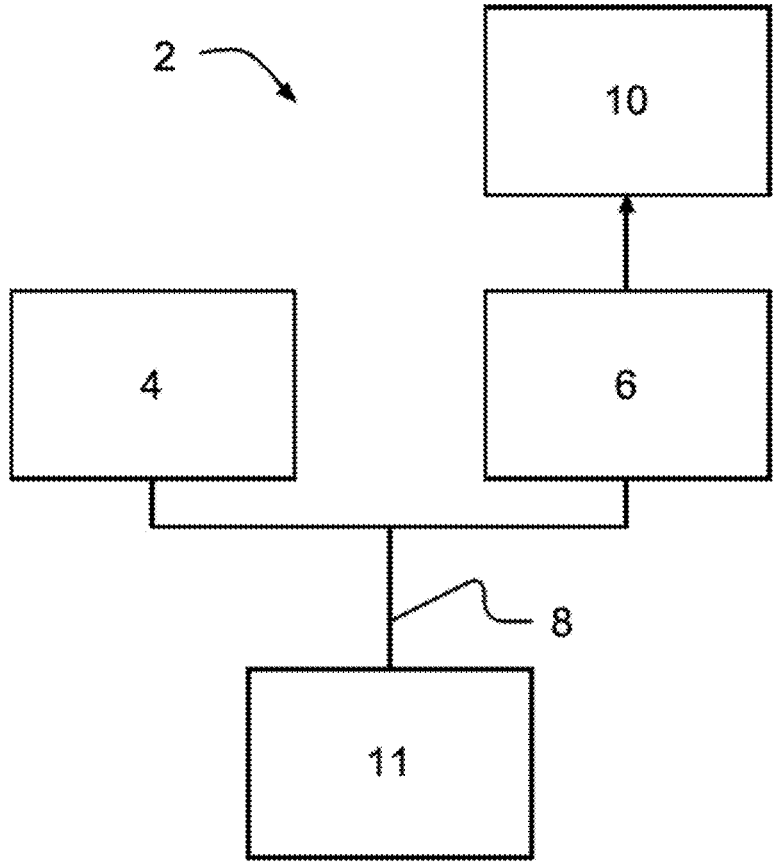

provided with an optical sensor and a converter so as to receive one or more light-transmission measurements from the optical sensor and to determine a sedimentation rate.

20 Claims, 5 Drawing Sheets

(56)                    References Cited

U.S. PATENT DOCUMENTS

| | | | |
|---|---|---|---|
| 7,207,939 B2 | 4/2007 | Husher | |
| 7,541,191 B2 | 6/2009 | Duic | |
| 10,088,467 B2 | 10/2018 | Fukuda | |
| 11,906,413 B2 | 2/2024 | Galiano | |
| 2009/0120157 A1* | 5/2009 | Ciotti | G01N 15/05 |
| | | | 73/1.02 |
| 2012/0326959 A1* | 12/2012 | Murthi | G06F 3/005 |
| | | | 382/173 |
| 2019/0011429 A1* | 1/2019 | Taagaard | G01N 33/492 |
| 2019/0346905 A1* | 11/2019 | Song | G06F 1/3212 |

FOREIGN PATENT DOCUMENTS

| | | | |
|---|---|---|---|
| EP | 2921862 A1 | 9/2015 | |
| IT | UA20163693 A1 | 11/2017 | |
| JP | 2006-502405 | 1/2006 | |
| JP | 2007-504468 | 3/2007 | |
| JP | 2015-178962 | 10/2015 | |
| JP | 2021-522470 | 8/2021 | |
| WO | WO-2021097610 A1 * | 5/2021 | G01N 33/726 |
| WO | WO2023/199008 | 10/2023 | |

* cited by examiner

DEVICE AND METHOD FOR PERFORMING A COMPLETE BLOOD COUNT AND DETERMINING A SEDIMENTATION RATE

This application is the § 371 U.S. National Stage of International Application No. PCT/FR2023/050544, filed Apr. 14, 2023, which was published on Oct. 19, 2023, as International Publication No. WO2023199008A1 and claims priority to French Patent Application No. FR2203572, filed Apr. 15, 2022, the disclosures of which are incorporated by reference herein in their entireties.

The invention relates to the field of haematology, and more particularly to the determination of the sedimentation rate (hereinafter ESR, also so-called "erythrocyte sedimentation rate").

The sedimentation rate is part of the routine examinations with the complete blood count (hereinafter CBC standing for "Complete Blood Count") performed during a blood assessment and allows detecting the presence of inflammatory or infectious pathologies. For example, rheumatism, a cancer and other conditions leading to changes in protein concentration in blood. A high ESR indicates an inflammatory state without prejudging its nature. However, it happens that the ESR remains low while there is an inflammatory syndrome. Hence, a high ESR generally indicates the presence of a pathology. The association of this non-specific test with complementary examinations allows having a more accurate diagnosis.

The reference method for measuring the ESR is the Westergren method. A narrow tube with standardised dimensions is filled with a blood sample sampled with an anticoagulant, for example EDTA, and diluted with sodium citrate and placed vertically. The ESR measurement is the height, in millimetres, of the plasma column after one hour of sedimentation. For example, it is considered that a height smaller than 10 mm after the first hour of sedimentation is a normal value for a male adult. The limit of normality is not an absolute value but depends on the age and gender of the patient.

The ESR is the resultant of three steps: aggregation of the haematids or blood cells, sedimentation, and settling of the rolls.

The phenomenon of aggregation of the haematids is produced in particular by blood proteins with a force which is even greater as the concentrations of these are high. The formation of the aggregates is the stacking of the haematids into "rolls", and then in three-dimensional structures. The sedimentation rate depends on the dimensions of the aggregates and on the viscosity of the plasma.

During the last steps, the aggregates will sediment, i.e. they will progressively fall at the bottom of the tube, then compact, which will have the effect of separating the sample into a clear translucent portion (plasma), at the top, and a much darker portion (haematids) at the bottom. The ESR is measured by the height of the translucent portion.

The most relevant inflammatory parameter is the aggregation phenomenon which directly depends on the concentrations of the plasma proteins. It is this phenomenon which is measured by the present invention to return an ESR value. It is also a parameter that is non-specific, but which suppresses the interferences resulting from the last two steps of the ESR. There is no standardised parameter allowing expressing this aggregation rate or dynamics/kinetics. Hence, it is relevant to transpose aggregation measurement quantities into ESR.

Because of the amount of blood (1.6 ml) and the duration required for completion thereof (1 hour), the Westergren method is not compatible with haematology machines for CBC analysis. To overcome these problems, researches have been conducted in order to use extinction optical measurements (absorption and scattering) to determine the sedimentation rate, like in U.S. Pat. No. 6,632,679.

Some patents, as described in EP 2 921 862, have proposed integrating a modified ESR measurement in a blood test apparatus which samples an amount of blood and separates it into two portions which respectively undergo a count (CBC) and a sedimentation rate measurement.

Hence, this apparatus relates the count measurement and the sedimentation rate measurement, which is disadvantageous because it requires complex apparatuses to dispense via one single sample, two blood sample portions towards the counting section on one side and towards the sedimentation rate measuring section on another side, all the more so as the CBC and ESR measurement operations do not have the same needs in terms of preparation of the sample.

Document ITUA20163693A1 describes an apparatus allowing performing haematological analyses on blood samples and allowing integrating the detection of the blood sedimentation rate (ESR) into the detection of other chemical and physical parameters of the blood.

Document WO 2021/097610 A1 describes a sample analyser comprising a module for measuring the erythrocyte sedimentation rate, a module for measuring the haemogram and a sample assignment module. The sample assignment module is used to collect a blood sample, assign a first portion of the blood sample to the erythrocyte sedimentation rate measurement module, and assign a second portion of the blood sample to the complete blood count measurement module. The erythrocyte sedimentation rate measurement module comprises a measurement tube and an optical measurement apparatus.

No known device allows carrying out a complete blood count and a determination of the sedimentation rate measurement in a rapid manner, decoupled from one another and with a simple architecture.

The invention improves the situation. To this end, it provides a device for performing a complete blood count and determining a sedimentation rate which comprises a first group arranged so as to sample a blood sample from a tube and to carry out a complete blood count on this sample, and a second group arranged so as to sample a blood sample from a tube and to carry out a sedimentation rate determination. The device comprises at least one sampling member which could be controlled for a measurement by the first group and a measurement by the second group for sampling a blood sample so that a sample sampled for the first group is not used by the second group, and that a sample sampled for the second group is not used by the first group, the second group being provided with a sensor comprising an infrared light source and an optical sensor arranged substantially opposite one another around a tube connected to an output end of the at least one sampling member so that the light emitted by the infrared light source reaches the optical sensor after having crossed said tube. The second group is further arranged so as to carry out a rinsing of the sampling member and of the tube between two sedimentation rate measurement determinations and the optical sensor is arranged so as to carry out a blank measurement after a rinsing operation. The device further comprises a converter arranged so as to receive a blank measurement and one or more light transmission measurement(s) from the optical sensor and to determine a sedimentation rate from the ratio between the blank measurement and the light transmission measurement(s).

This device is particularly advantageous because it allows carrying out the sedimentation rate measurement independently of the complete blood count. Thus, the sedimentation rate measurement, which remains a less systematic test, does not interfere with the architecture of the device in a manner likely to affect the other functionalities.

According to various embodiments, the invention may have one or more of the following features:

the infrared light source and the optical sensor are arranged at a distance from the sampling end of the sampling member shorter than 10 cm, the second group is arranged at an inlet of the device upstream of the first group, or at the outlet of the device for carrying out spreading or colouring type complementary measurements downstream of the first group, the converter is arranged so as to determine a time point of measurement of the lowest light transmission, and a time point of measurement of the final light transmission the optical sensor is arranged so as to implement a maximum gain between the time point of measurement of the lowest light transmission and the time point of measurement of the final light transmission, and to implement a minimum gain the rest of the time, the converter is arranged so as to calculate the sedimentation rate from the ratio between on the one hand the ratio between the blank measurement and the measurement at the time point of measurement of the final light transmission and, on the other hand, the ratio between the blank measurement and the measurement at the time point of measurement of the lowest light transmission, the optical sensor is controlled with a low gain before blood passes through the substantially transparent portion, and with a high gain afterwards, and the sampling member is a needle which could be controlled for sampling of a blood sample to which a tube is connected in which the substantially transparent portion is formed.

The invention also relates to a method for performing a complete blood count and determining a sedimentation rate which comprises using a device according to the invention, carrying out a complete blood count on the one hand and determining a sedimentation rate on the other hand comprising sampling two distinct samples.

Figure 2:
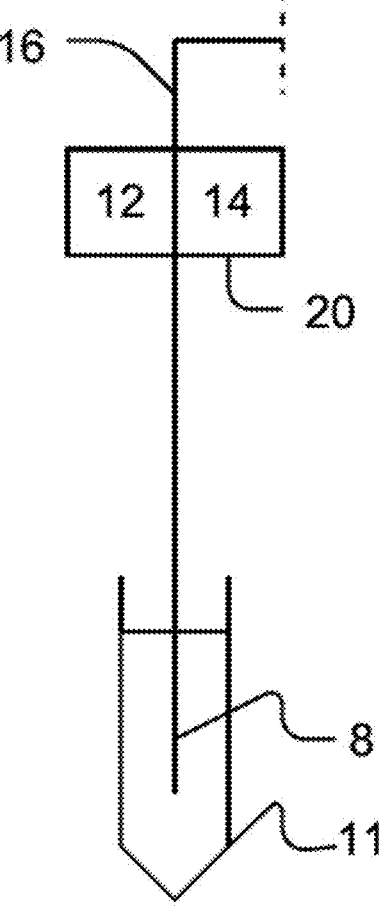
Figure 3:
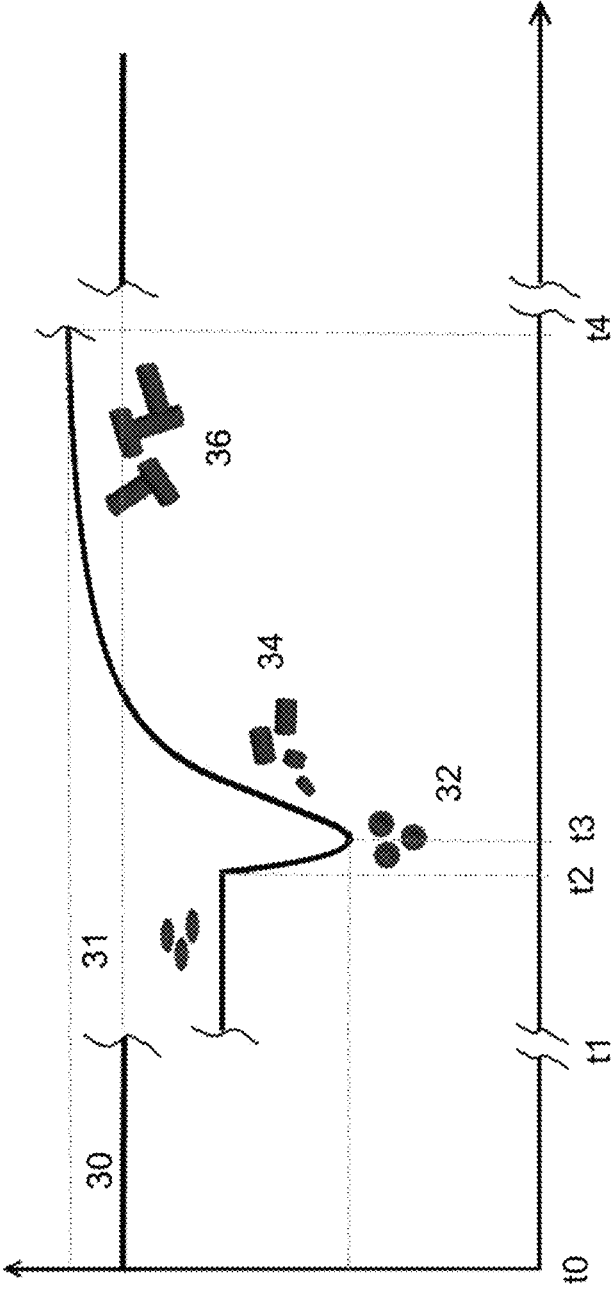
Figure 4:
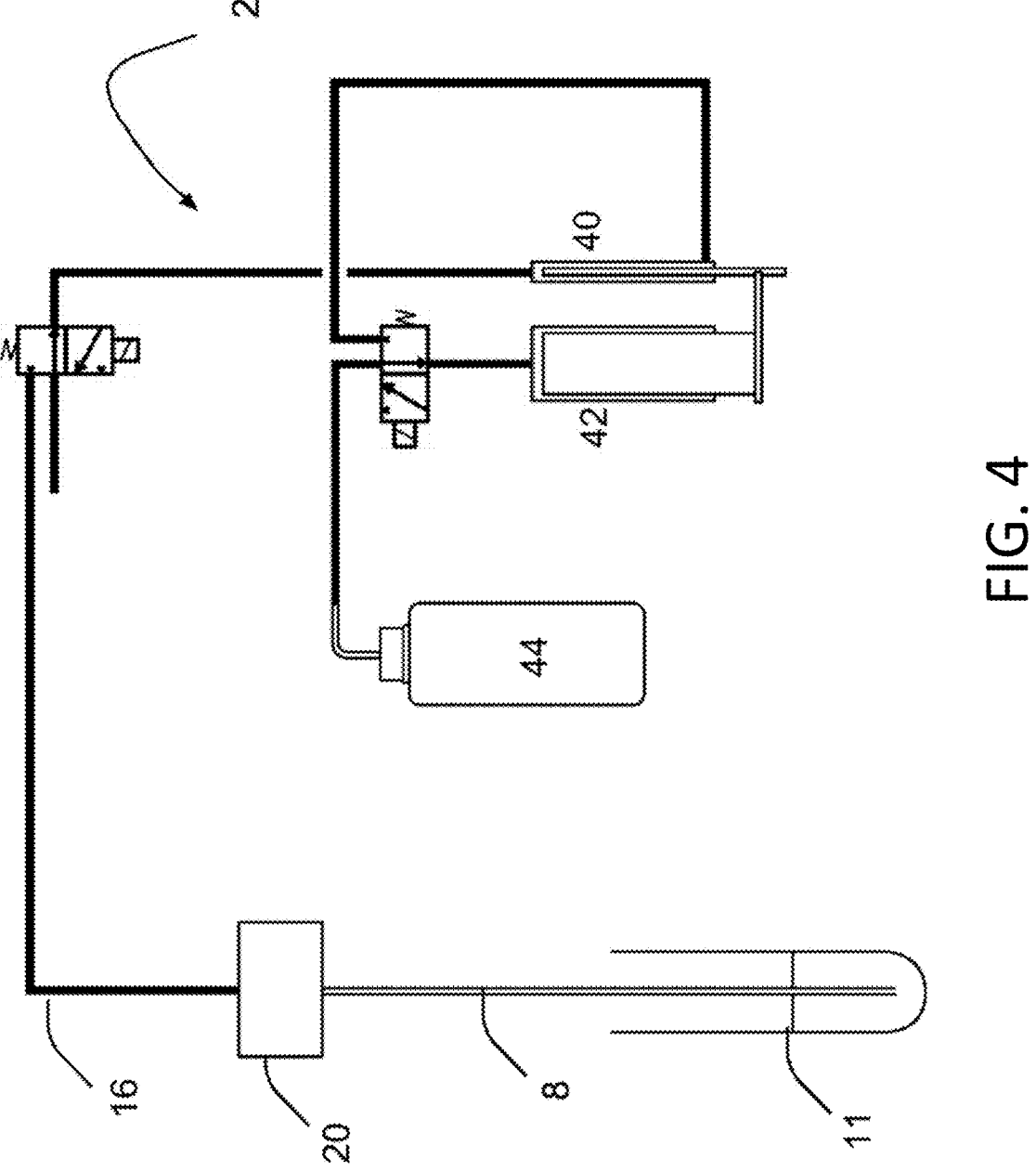
Figure 5:
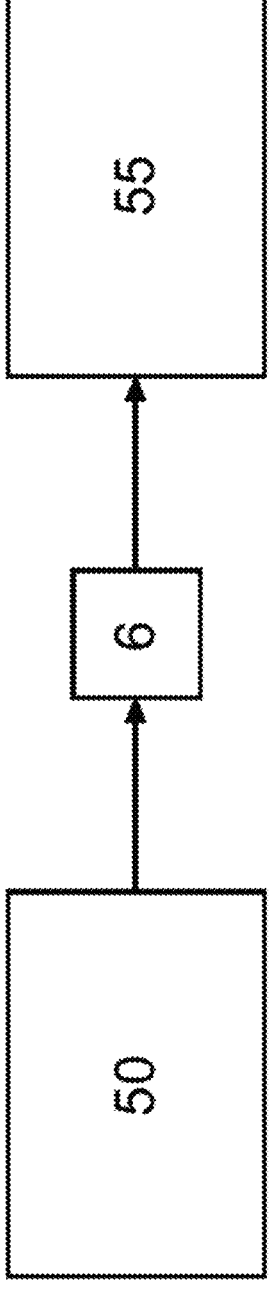

Other features and advantages of the invention will appear better upon reading the following description, with reference to examples given for illustrative and non-limiting purposes, with reference to the drawings wherein:

FIG. 1 shows a general schematic view of a device according to the invention, FIG. 2 shows a detail of making of an element of FIG. 1, FIG. 3 shows a measurement diagram by the device of FIG. 1, FIG. 4 shows a schematic view of a first embodiment of the device of FIG. 1, and FIG. 5 shows a schematic view of a second embodiment of the device of FIG. 1.

The drawings and the description hereinafter essentially contain elements of certain nature. Hence, they could not only serve to better understand the present invention, but also contribute to the definition thereof, where appropriate.

FIG. 1 shows a general schematic view of a device 2 for performing a complete blood count and for determining the sedimentation rate measurement according to the invention. The device 2 comprises a first group 4, a second group 6, a sampling member 8 and a converter 10.

The first group 4 is arranged so as to sample a blood sample in a tube and to primarily carry out a complete blood count on this sample. This measurement may be carried out in a conventional manner and is known elsewhere. Numerous haematology apparatuses are specialised in carrying out this measurement. Other types of blood analysis than CBC may be carried out within the group 4, such as glycated haemoglobin (HbA1c) measurements, C-reactive protein (CRP), etc.

The second group 6 is arranged so as to determine an ESR measurement. It is this second group which is the main object of the invention. Indeed, as described in the introduction, this test, whether it is carried out according to the conventional method or by measuring the change in the light absorbance, is either tedious, or coupled to a CBC measurement, which slows down the entire device.

The implementation of the second group 6 according to the invention allows extrapolating a sedimentation rate measurement by changing the light absorbance in a manner decoupled from any CBC measurement or other blood measurements. For this purpose, the second group 6 is arranged so as to control the sampling member 8 which is herein a needle independently of the first group 4, i.e. the samples sampled by the first group 4 are used only for a CBC measurement or other blood measurements, and the samples sampled by the second group 6 are used only for an ESR measurement.

Thus, as shown in FIG. 1, the first group 4 or the second group 6 controls the needle 8 to sample a blood sample in a blood tube 11. Afterwards, this sample is brought to the first group 4 to carry out a CBC measurement or other blood measurements, or to the second group 6 to carry out a measurement of the change in light absorbance. In the last case, the measurement is transmitted to the converter 10 which returns an ESR signal and/or an ESR measurement value.

FIG. 2 shows an embodiment of the second measuring group 6. According to this example, the second measuring group 6 is made by means of an optical source 12 and an optical sensor 14 which are assembled opposite one another around a tube 16 which is intended to transport the blood sample sampled by the needle 8 from a blood tube 11 towards the inside of the device 2.

In the example described herein, the light source 12 is of the LED type with an infrared wavelength preferably in the range 700-980 nm and in particular 800 nm, which is an isosbestic point between oxyhaemoglobin and deoxyhaemoglobin, which makes the measurement insensitive to the blood oxygen saturation level. In the example described herein, the optical sensor 14 is of the photodiode type and may be selected from among PMT, PDA, CMOS, etc., sensors. In the example described herein, the tube 16 is made of Teflon and is connected to the needle 8. Alternatively, the tube 16 may be made of glass or plastic and should be selected so as to offer a good transparency to the wavelength of the light source 12.

The light source assembly 12 and optical sensor 14 could be seen as one single sensor 20 of the second group 6. Like in the example described herein, it may be made into two portions which are assembled together to clasp the needle 8 (for example metallic) and the tube 16. Alternatively, the light source 12 and the optical sensor 14 may be made in one-piece. Preferably, the sensor 20 is arranged quite close to the end of the needle 8, at less than 10 cm from the latter, in order to optimise the shear of the red blood cells.

Preferably, this distance is about 5 cm to obtain the best results. In one variant, the sensor 20 may be placed directly at the outlet of the needle 8.

Irrespective of the configuration, the second group 6 allows advantageously using the diameter of the needle 8 which is conventionally in the range of 1 mm. Indeed, during sampling by the needle 8, the red blood cells undergo successive deformations which are described hereinafter and which are shown in FIG. 3.

Thus, once the needle 8 is immersed into the blood tube 11, the second group 6 controls a suction by the needle 8 already primed with diluent in order to sample blood. This is achieved thanks to automation control means, preparation trays and solenoid valves and syringes that are also known and not shown for simplicity. These means cause movement of the diluent that occupies the tube 16. In this step, because of the translucent nature of the tube 16 and of the diluent contained therein, the sensor 20 measures a constant optical signal.

Afterwards, the blood aliquot is moved up to the sensor 20 by suction. The red blood cells undergo shear, which breaks the aggregation. In this step, the optical signal remains maximum since the blood is not yet opposite the sensor 20. In FIG. 3, this is shown with the reference 30.

When the blood reaches the sensor, the optical signal represents the sheared state of the blood. At this blood shear stage, the haematids have an elongate shape, as shown with the reference 31.

When the suction stops in order to stop shearing, the optical transmission signal drops because the red blood cells recover their biconcave disk relieved form. In FIG. 3, this is shown with the reference 32. Afterwards, the optical signal increases according to a pseudo-logarithmic progression. The progressive increase in the optical signal measured by the optical sensor 14 is related to the progressive aggregation of the free red blood cells. The aggregation is done by stacking red blood cells forming rolls and then three-dimensional structures, which is shown in FIG. 3 with the references 34 and 36.

Beyond about 40 s depending on the bloods, the aggregation is substantially slowed down and the sedimentation starts. This start of sedimentation interferes with the measurement of interest which is the aggregation and its correlation with the sedimentation rate. After t4, the blood aliquot is discharged, for example by moving the needle 8 over a tray. Thus, it is proceeded with the discharge of the blood and with rinsing of the tube 16 with diluent, the tube 16 being at the end of this step completely filled with diluent like at the beginning of the procedure described hereinabove.

Four time points are shown in FIG. 3:

before the time point t1, the tube 16 is filled with diluent, the time point t1 marks the time point at which the blood arrives at the level of the sensor 20 by suction, the time point t2 marks the time point at which the suction ceases, the time point t3 marks the time point beyond which the red blood cells have recovered their relaxed shape, and the aggregation starts, the time point t4 marks the procedure end time point, with the discharge of the blood which is again replaced by the diluent, like before the time point t1.

The observation of FIG. 3 shows that the optical signal is less important after the time point t 4, while the tube 16 is filled with diluent, than when the tube 16 is filled with blood, which might seem to be paradoxal. This is explained by the fact that, in the example described herein, the optical sensor

14 is conditioned differently before the time point t1 and after the time point t4 of FIG. 3.

Thus, before the time point t1 and after the time point t4, it is determined that the measurement corresponds to a "blank" measurement. Throughout this period, the optical sensor 14 is conditioned by the converter 10 with a minimum measurement gain.

The time point t3 corresponds to the lowest point of the period t1-t4, beyond which the optical signal start increasing, which marks, as described hereinabove, the start of the phenomenon that the invention aims to measure. For this reason, and since the variation of the optical signal remains low between the time point to and the time point t1, in the example described herein, the optical sensor 14 is conditioned with a minimum gain until the time point t1, then with a maximum gain between the time point t1 and t4, and then again with a minimum gain after the time point t4 for the next measurement.

This is even more advantageous as, in the embodiment described herein, the converter 10 is arranged so as to determine a measurement based on the optical density of the signal measured by the optical sensor 14. It should be recalled that the optical density is defined by the formula $DO(t)=\log(KI0/I(t))$ where $I(t)$ is the measurement of the optical sensor at the time point t and K the maxi gain/mini gain ratio. More specifically, the converter 10 is arranged so as to return a sedimentation rate measurement based on the $DO(t3)/DO(t4)$ ratio. The Applicant has carried out numerous sedimentation rate measurements using the Westergren reference method which enable the converter 10 to associate the measurements thus calculated with an ESR value.

The Applicant has discovered that it is particularly advantageous to use the optical density, which allows not depending on any variations in the transmittance measurement. The Applicant has also discovered that the converter 10 could also operate based on the ratio $I(t_4)/I(t_3)$, without having to consider the optical density within the Beer-Lambert meaning and using 10 differently in the calculation.

The converter 10 may be made in various manners, for example in the form of an appropriate computer code executed on one or more processor(s). By processors, it should be understood any processor suited to the calculations described hereinbelow. Such a processor may be made in any known manner, in the form of a microprocessor for a personal computer, laptop, tablet or smartphone, an FPGA or SoC type dedicated chip, a computing resource on a grid or in the cloud, a cluster of graphical processors (GPUs), a microcontroller, or any other form capable of providing the computing power necessary to the completion of the process described hereinbelow. One or more of these elements may also be made in the form of specialised electronic circuits such as an ASIC. A combination of a processor and of electronic circuits may also be considered. In the case of the machine learning unit based on gradient boosting, processors dedicated to machine learning could also be considered. Alternatively, the converter 10 may be an analog computer without any programming or computer code as such.

Still alternatively, the converter 10 could use a machine learning algorithm ("machine learning"), which may involve or not a neural network (deep or not). This consists in associating the intensity measurements of the optical sensor 14 with a sedimentation rate value. This variant may be particularly useful to do without the optical density. Still alternatively, the gain of the optical sensor 14 could be the same for all time points of the measurement.

FIG. 4 shows a schematic view of an embodiment of the device of FIG. 1. As shown in this figure, the device 2 is a conventional haematology apparatus comprising a syringe 40 with a 1.5 mm diameter, and a syringe 42 with a 16 mm diameter, both of which are connected to the needle 8. The sensor 20 has been integrated on the needle 8, so that it covers the end of the tube 16 connected to the needle 8.

The device 2 of FIG. 4 is adapted to carry out a CBC measurement, an ESR measurement or both.

For the CBC measurement, the entire circuit is primed with diluent, then the needle 8 hits the blood tube 11 and samples 10 μl with the syringe 40. Afterwards, the needle 8 is raised and placed over the preparation tray, then the outside of the latter is rinsed in this tray, with discharge into the wastes. Finally, a mixture of the 10 μL sample with 1 mL of diluent (for example) is immediately dispensed after sampling in the preparation tray with the syringe 42. Afterwards, this first dilution will be used in the different preparations to carry out the CBC measurement. Advantageously, once the blood aliquot is discharged into the preparation tray, the internal and external rinsing of the needle 8 may be carried out.

For the ESR measurement, it is proceeded as described hereinabove with reference to FIGS. 1 to 3. The entire circuit is primed with diluent drawn from a reservoir 44, then an air bubble of a few μL is created at the tip of the needle 8. The needle 8 is lowered into the blood tube 11 and a 50 μL to 100 μL aliquot is sampled by the syringe 42. The needle 8 is raised, and the aliquot transferred to the sensor 20 and the optical measurement of the aggregation is carried out. Finally, the internal and external rinsing of the needle 8 in a tray is carried out, with discharge into the wastes. The blank measurement (I0) may be performed before sampling or at the end of rinsing. The optional comparison of the blank measurements before and after enable an exception handling, for example a control of rinsing.

The CBC and ESR cycles are carried out independently of each other, and involve in particular a separate sampling by the needle 8: the aliquot for the CBC measurement cannot be used for the ESR measurement and vice versa.

A mixture of the 10 μL sample with 1 mL of diluent (for example) is dispensed immediately after sampling in the preparation tray with the syringe 42. Afterwards, this first dilution will be used in the different preparations to carry out the CBC measurement.

This allows decoupling the two measurements without any problematic blood sampling when both measurements are requested. This independence makes the measurement ESR much less troublesome for the work rate of the device 2 and enables integration at a lower cost, both with regards to equipment and manpower.

FIG. 5 shows a schematic view of another embodiment of the device of FIG. 1. As shown in this figure, the device 2 is this time adapted to an automated laboratory measurement chain of the TLA ("Total Laboratory Automation") type.

The mandatory equipment to feed the sample to the measurement cell of the device 2 is by far the most expensive and complex part: interconnection to the TLA chain, management of racks of tubes, stirring of the tubes, management of the tubes, sampling and transfer in the measurement cell, rinsing of the sampling device and devices for monitoring and transmitting the results.

The Applicant has discovered that, in this configuration, it is advantageous to integrate a second group 6 into a module separate from the main CBC module 50 and connected thereto. For example, the second group 6 may be integrated into the sampling needle of the group 4 of a spreading or colouring module 55. Thus, this module will have its use rate increase, and the work rate of the TLA will not be affected since the ESR measurements will herein again be carried out completely independently of the CBC measurements for a given blood tube.

This is much more effective than all known systems, which offer either a specific module for measuring the sedimentation rate, in addition to the spreading or colouring module, or to draw off CBC/DIF/RET processing time on a general-purpose module.

Alternatively, the second group 6 may be integrated on the sampling needle of a high-end device which comprises a specific sampling module for subsequent spreading or colouring measurements.

Hence, the invention allows effectively integrating the sedimentation rate measurement to existing devices, without affecting their work rates or their architecture.

The invention claimed is:

1. A device for performing a complete blood count and determining a sedimentation rate, comprising:
   a first group arranged so as to sample a blood sample from a tube and to carry out a complete blood count on this sample;
   a second group arranged so as to sample a blood sample from a tube and to carry out a sedimentation rate determination;
   at least one sampling member controllable for a measurement by the first group and a measurement by the second group for sampling a blood sample so that the sample sampled for the first group is not used by the second group, and that the sample sampled for the second group is not used by the first group, the second group being provided with a sensor comprising an infrared light source and an optical sensor arranged substantially opposite one another around a tube connected to an output end of the at least one sampling member so that light emitted by the infrared light source reaches the optical sensor after having crossed said tube, the second group being further arranged so as to carry out a rinsing of the at least one sampling member and of the tube between two sedimentation rate measurement determinations and the optical sensor being arranged so as to carry out, after a rinsing operation, a blank measurement based on the light emitted by the infrared light source and crossing the tube in an absence of the blood sample, the optical sensor being controlled with a low gain before blood passes through a substantially transparent portion, and with a high gain afterwards; and
   a converter arranged so as to receive the blank measurement and one or more light transmission measurements from the optical sensor and to determine a sedimentation rate from a ratio between the blank measurement and the one or more light transmission measurements.

2. The device according to claim 1, wherein the second group is arranged at an inlet of the device upstream of the first group, or at an outlet of the device for carrying out spreading or colouring type complementary measurements downstream of the first group.

3. The device according to claim 1, wherein the converter is arranged so as to determine a time point of measurement of a lowest light transmission, and a time point of measurement of a final light transmission.

4. The device according to claim 3, wherein the optical sensor is arranged so as to implement a maximum gain between the time point of measurement of the lowest light transmission and the time point of measurement of the final light transmission, and to otherwise implement a minimum gain.

5. The device according to claim 3, wherein the converter is arranged so as to calculate the sedimentation rate from the ratio between (a) the ratio between the blank measurement and the measurement at the time point of measurement of the final light transmission and (b) the ratio between the blank measurement and the measurement at the time point of measurement of the lowest light transmission.

6. The device according to claim 1, wherein the at least one sampling member is a needle which could be controlled for sampling of a blood sample to which a tube is connected in which a substantially transparent portion is formed.

7. A method for performing a complete blood count and determining a sedimentation rate comprising using a device according to claim 1, wherein carrying out the complete blood count and determining the sedimentation rate comprise sampling two distinct samples.

8. The method according to claim 7, wherein the second group is arranged at an inlet of the device upstream of the first group, or at an outlet of the device for carrying out spreading or colouring type complementary measurements downstream of the first group.

9. The method according to claim 7, wherein the converter is arranged so as to determine a time point of measurement of a lowest light transmission, and a time point of measurement of a final light transmission.

10. The method according to claim 9, wherein the optical sensor is arranged so as to implement a maximum gain between the time point of measurement of the lowest light transmission and the time point of measurement of the final light transmission, and to otherwise implement a minimum gain.

11. The method according to claim 9, wherein the converter is arranged so as to calculate the sedimentation rate from the ratio between (a) the ratio between the blank measurement and the measurement at the time point of measurement of the final light transmission and (b) the ratio between the blank measurement and the measurement at the time point of measurement of the lowest light transmission.

12. The method according to claim 7, wherein the at least one sampling member is a needle controllable for sampling of a blood sample to which a tube is connected in which a substantially transparent portion is formed.

13. A device for performing a complete blood count and determining a sedimentation rate, comprising:

a first group arranged so as to sample a blood sample from a tube and to carry out a complete blood count on this sample;

a second group arranged so as to sample a blood sample from a tube and to carry out a sedimentation rate determination;

at least one sampling member controllable for a measurement by the first group and a measurement by the second group for sampling a blood sample so that the sample sampled for the first group is not used by the second group, and that the sample sampled for the second group is not used by the first group, the second group being provided with a sensor comprising an infrared light source and an optical sensor arranged substantially opposite one another around a tube connected to an output end of the at least one sampling member so that light emitted by the infrared light source reaches the optical sensor after having crossed said tube, the second group being further arranged so as to carry out a rinsing of the at least one sampling member and of the tube between two sedimentation rate measurement determinations and the optical sensor being arranged so as to carry out, after a rinsing operation, a blank measurement based on the light emitted by the infrared light source and crossing the tube in an absence of the blood sample; and a converter arranged so as to receive the blank measurement and one or more light transmission measurements from the optical sensor and to determine a sedimentation rate from a ratio between the blank measurement and the one or more light transmission measurements, wherein the converter is arranged so as to determine a time point of measurement of a lowest light transmission, and a time point of measurement of a final light transmission, and the optical sensor is arranged so as to implement a maximum gain between the time point of measurement of the lowest light transmission and the time point of measurement of the final light transmission, and to otherwise implement a minimum gain.

14. The device according to claim 13, wherein the second group is arranged at an inlet of the device upstream of the first group, or at an outlet of the device for carrying out spreading or colouring type complementary measurements downstream of the first group.

15. The device according to claim 13, wherein the converter is arranged so as to calculate the sedimentation rate from the ratio between (a) the ratio between the blank measurement and the measurement at the time point of measurement of the final light transmission and (b) the ratio between the blank measurement and the measurement at the time point of measurement of the lowest light transmission.

16. The device according to claim 13, wherein the optical sensor is controlled with a low gain before blood passes through a substantially transparent portion, and with a high gain afterwards.

17. The device according to claim 13, wherein the at least one sampling member is a needle which could be controlled for sampling of a blood sample to which a tube is connected in which a substantially transparent portion is formed.

18. A method for performing a complete blood count and determining a sedimentation rate comprising using a device according to claim 13, wherein carrying out the complete blood count and determining the sedimentation rate comprise sampling two distinct samples.

19. The method according to claim 18, wherein the second group is arranged at an inlet of the device upstream of the first group, or at an outlet of the device for carrying out spreading or colouring type complementary measurements downstream of the first group.

20. The method according to claim 18, wherein the optical sensor is controlled with a low gain before blood passes through a substantially transparent portion, and with a high gain afterwards.

* * * * *